(12) United States Patent
Yoshikawa

(10) Patent No.: US 11,230,490 B2
(45) Date of Patent: Jan. 25, 2022

(54) SEAL STRUCTURE FOR OPTICAL FIBER DRAWING FURNACE AND OPTICAL FIBER PRODUCTION METHOD

(71) Applicant: SUMITOMO ELECTRIC INDUSTRIES, LTD., Osaka (JP)

(72) Inventor: Satoshi Yoshikawa, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 254 days.

(21) Appl. No.: 16/465,164

(22) PCT Filed: Nov. 28, 2017

(86) PCT No.: PCT/JP2017/042500
§ 371 (c)(1),
(2) Date: May 30, 2019

(87) PCT Pub. No.: WO2018/101228
PCT Pub. Date: Jun. 7, 2018

(65) Prior Publication Data
US 2020/0002213 A1 Jan. 2, 2020

(30) Foreign Application Priority Data
Nov. 30, 2016 (JP) .............................. JP2016-232151

(51) Int. Cl.
*C03B 37/027* (2006.01)
*C03B 37/029* (2006.01)

(52) U.S. Cl.
CPC ...... *C03B 37/02736* (2013.01); *C03B 37/029* (2013.01); *C03B 2205/80* (2013.01); *C03B 2205/96* (2013.01)

(58) Field of Classification Search
None
See application file for complete search history.

(56) References Cited

U.S. PATENT DOCUMENTS

| 2011/0265522 A1* | 11/2011 | Okada | C03B 37/029 65/424 |
|---|---|---|---|
| 2019/0210910 A1* | 7/2019 | Yoshikawa | C03B 37/029 |
| 2020/0199009 A1* | 6/2020 | Konishi | C03B 37/029 |

FOREIGN PATENT DOCUMENTS

JP 2014-162671 A 9/2014

OTHER PUBLICATIONS

Complete Specification published Mar. 16, 2018 in Indian Patent Application No. 201744032017.

* cited by examiner

*Primary Examiner* — Lisa L Herring
(74) *Attorney, Agent, or Firm* — Faegre Drinker Biddle & Reath LLP

(57) ABSTRACT

A seal structure for an optical fiber drawing furnace is for plugging a gap between an upper end opening of the fiber furnace, and an optical fiber glass preform wherein a seed rod and a taper portion are present in an upper portion thereof. The seal structure comprises a first cap member engaging the seed rod of the glass preform; a second cap member covering the taper portion of the glass preform and the first cap member; a spacer member disposed between the first and second cap member, supporting the second cap member, adjusting, via a positional adjustment structure, the height position of the second cap member in the axial direction, and causing the lower extremity of the second cap member to be at a position close to the taper portion; and a seal member which seals between the upper end opening and the glass preform and/or second cap member.

4 Claims, 5 Drawing Sheets

SEAL STRUCTURE FOR OPTICAL FIBER DRAWING FURNACE AND OPTICAL FIBER PRODUCTION METHOD

TECHNICAL FIELD

The present invention relates to a seal structure for an optical fiber drawing furnace and an optical fiber production method, and more particularly, to a seal structure for an optical fiber drawing furnace for sealing a gap between an upper end opening of the optical fiber drawing furnace, and an optical fiber glass preform having a seed rod and a taper portion formed on an upper portion thereof, and an optical fiber production method.

BACKGROUND ART

An optical fiber is drawn from a lower portion of an optical fiber drawing furnace (hereinafter, referred to as a drawing furnace) by inserting an optical fiber glass preform (hereinafter, referred to as a glass preform), including quartz as a main ingredient, into an furnace core tube from an upper end opening of the drawing furnace, and by reducing a diameter of a leading end of the glass preform by heating and fusing.

In general, the glass preform is produced by using a seed rod of a small diameter as initial glass, and vitrifying by piling glass fine particles on an end portion of the seed rod. To this end, the glass preform has a diameter gradually decreasing from an upper end of a direct body portion to a boundary portion with the seed rod in a taper shape (referred to as a taper portion), and a dummy rod having substantially the same diameter is connected to the seed rod and the glass preform is suspended in the furnace core tube of the drawing furnace.

Since the glass preform has the taper portion having the diameter greatly increasing as described above, it is difficult to seal at positions of the taper portion, the seed rod, and the dummy rod. For example, patent citation 1 discloses technology of a seal structure for stabilizing a seal at a side of an insertion opening of a glass preform.

Specifically, a sleeve member is disposed on the dummy rod to surround the outer circumference thereof. A first seal portion and a second seal portion are disposed on the upper end opening of the drawing furnace and an upper portion of the upper end opening, respectively. At the time of initial drawing, the first seal portion seals the direct body portion of the glass preform. After the glass preform further descends and the taper portion of the glass preform starts passing through the first seal portion, a switch is made from the first seal portion to the second seal portion, and the second seal portion seals the outer circumference of the sleeve member surrounding the dummy rod.

CITATION LIST

Patent Literature

Patent Literature 1: JP-A-2014-162671

SUMMARY OF INVENTION

Technical Problem

In patent literature 1, to reduce a change of pressure in the furnace when a drawing is conducted, it is preferable to extend the sleeve member surrounding the dummy rod downwardly as long as possible to cover the seed rod or the taper portion. The sleeve member described above is also referred to as a cap member. Such a cap member needs to have a length that does not cause a lower end of the cap member to be in contact with the taper portion of the glass preform to prevent from being welded.

Here, the length or shape of the taper portion of the glass preform is not regular. To cope with the difference in length of the taper portion, a plurality of cap members having different heights may be prepared, and, every time the glass preform is set in the drawing furnace, the cap member may be removed and may be replaced with another cap member. However, this may cause inconvenience, and there is a problem that the glass preform may not be easily set in the drawing furnace.

If a spacer member is used to determine a position of the cap member, a plurality of cap members do not need to be prepared, but there is a need to prepare a plurality of spacer members having different heights. In addition, there is inconvenience that the cap member or the spacer member should be removed and replaced with another spacer member every time the glass preform is set in the drawing furnace.

The present invention has been developed to solve the above-mentioned problems, and an object of the present invention is to provide a seal structure for an optical fiber drawing furnace, which can easily set a glass preform having a cap member mounted thereon in a drawing furnace, and an optical fiber production method.

Solution to Problem

A seal structure for an optical fiber drawing furnace according to an embodiment of the present invention is a seal structure for an optical fiber drawing furnace for plugging a gap between an upper end opening of the optical fiber drawing furnace and an optical fiber glass preform which has a seed rod and a taper portion formed on an upper portion thereof, and includes: a first cap member which is engaged with the seed rod of the optical fiber glass preform; a second cap member which covers the taper portion of the optical fiber glass preform and the first cap member; a spacer member which is disposed between the first cap member and the second cap member, and supports the second cap member, adjusts a height position of the second cap member in an axial direction by a position adjustment structure, and causes a lower end of the second cap member to be positioned close to the taper portion; and a seal member which establishes a seal between the optical fiber glass preform and/or the second cap member, and the upper end opening.

Advantageous Effects of Invention

According to the above description, a plurality of spacer members or a plurality of cap members are not required, and a glass preform having a cap member mounted thereon can be easily set in a drawing furnace.

DESCRIPTION OF EMBODIMENTS

Figure 1:
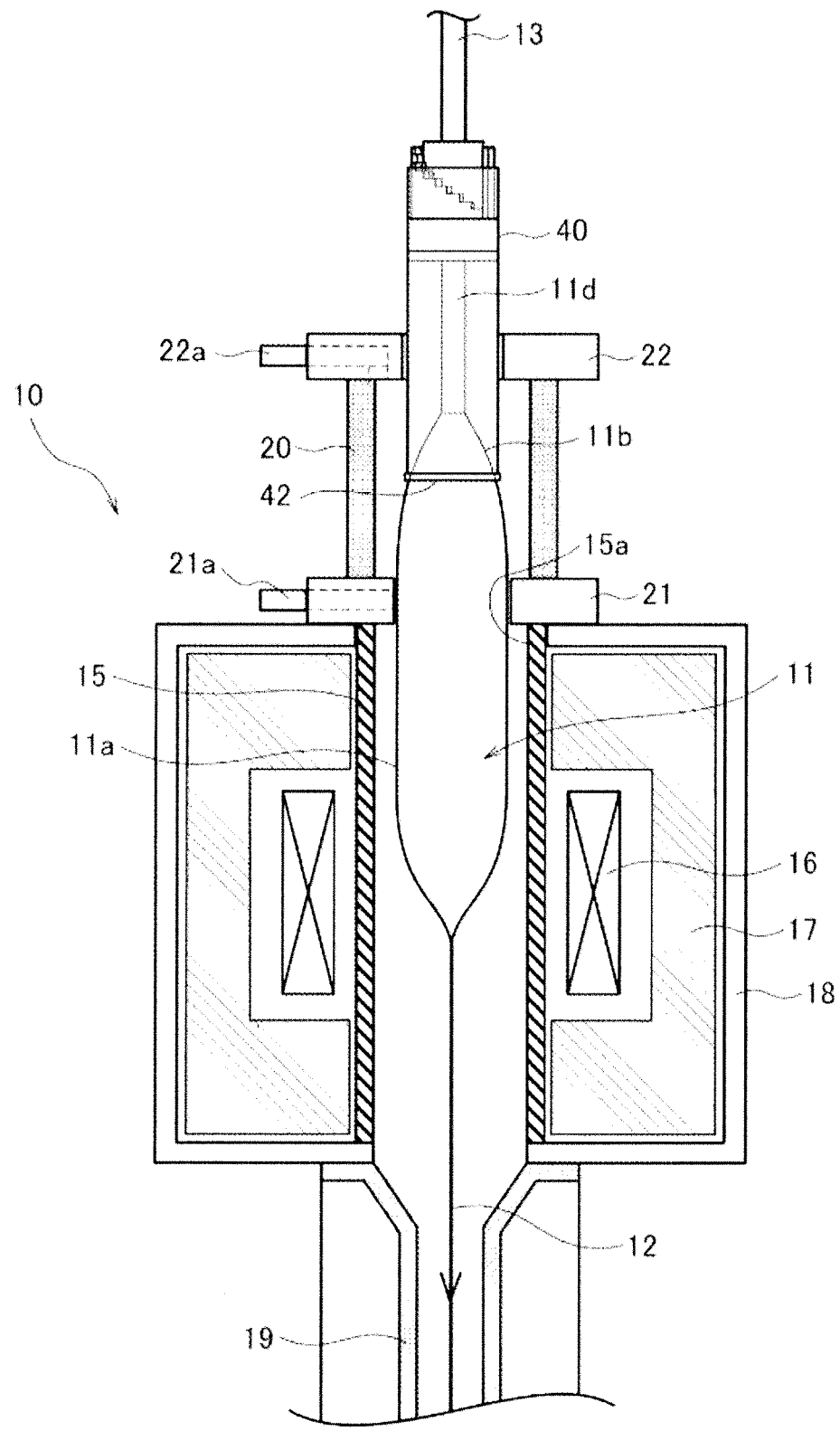
FIG. 1 is a view schematically illustrating an optical fiber production method according to an embodiment of the present invention.

Description of Embodiment of the Present Invention

First, details of an embodiment of the present invention are listed and are described. A seal structure for an optical fiber drawing furnace according to an embodiment of the present invention is (1) a seal structure for an optical fiber drawing furnace for sealing a gap between an upper end opening of the optical fiber drawing furnace and an optical fiber glass preform which has a seed rod and a taper portion formed on an upper portion thereof, and includes: a first cap member which is engaged with the seed rod of the optical fiber glass preform; a second cap member which covers the taper portion of the optical fiber glass preform and the first cap member; a spacer member which is disposed between the first cap member and the second cap member, and supports the second cap member, adjusts a height position of the second cap member in an axial direction by a position adjustment structure, and causes a lower end of the second cap member to be positioned close to the taper portion; and a seal member which seals between the optical fiber glass preform and/or the second cap member, and the upper end opening. Since the spacer member is configured to be able to adjust the height positions of the second cap member in the axial direction, there is no need to prepare a plurality of spacer members having different heights, and an operation of removing the second cap member from the glass preform and replacing the spacer member is not required. In addition, there is no need to prepare a plurality of second cap members having different heights.

(2) The position adjustment structure includes support portions formed on an upper surface of the spacer member in a circumferential direction and having different height positions in the axial direction. It is possible to adjust the height positions of the second cap member in the axial direction through the one spacer member.

(3) The position adjustment structure includes support portions formed on a side surface of the spacer member in a circumferential direction and having different height positions in the axial direction. It is possible to adjust the height positions of the second cap member in the axial direction through the one spacer member.

(4) The support portions are formed in a step-wise shape. It is possible to adjust the height positions of the second cap member in the axial direction by using a difference in heights.

(5) An optical fiber production method which draws out an optical fiber by heating and fusing the optical fiber glass preform in the drawing furnace by using the above-described seal structure is provided. Since the height positions of the second cap member in the axial direction can be easily adjusted, a drawing operation can be rapidly started.

Details of Embodiment of the Present Invention

Hereinafter, preferred embodiments of a seal structure for an optical fiber drawing furnace and an optical fiber production method will be described with reference to the accompanying drawings. Although a resistance furnace heating a furnace core tube by using a heater is described hereinafter, the present invention can be applied to an induction furnace which induction heats a furnace core tube by applying a high frequency power to a coil. In addition, regarding a method for splicing a glass preform and a dummy rod, the following description is merely an example and the method is not limited hereto.

As shown in FIG. 1, a drawing furnace 10 includes, for example, a furnace housing 18, a lower chamber 19, and an upper chamber 20. A cylindrical furnace core tube 15 which is formed with carbon is disposed in the center of the furnace housing 18, and fluidly communicates with the lower chamber 19 and the upper chamber 20.

The upper chamber 20 has, for example, an inner diameter which is the same as the furnace core tube 15, and has a glass preform 11 inserted from an upper portion thereof. A dummy rod 13 (also referred to as a support rod), which will be described below, is connected to an upper end of the glass preform 11.

A seal mechanism is disposed on the upper chamber 20 to achieve airtightness. Specifically, a first seal portion 21 is disposed on an upper end opening 15a of the furnace core tube 15, and is configured to be able to seal a gap between the upper end opening 15a and the glass preform 11. A gas supply opening 21a is disposed in the first seal portion 21 to supply inert gas, etc. such as argon gas, etc. to the furnace core tube 15.

A second seal portion 22 which has the same seal function as the first seal portion 21 is disposed on an upper end of the upper chamber 20. A gas supply opening 22a is also disposed in the second seal portion 22 to supply inert gas, etc. such as argon gas, etc. to the furnace core tube 15.

The glass preform 11 is suspended in the furnace core tube 15 and descends while being sealed by the first and second seal portions 21, 22. Specifically, at the time of initial drawing, the first seal portion 21 seals on a direct body portion 11a of the glass preform 11.

Subsequently, after a taper portion 11b of the glass preform 11 starts passing through the first seal portion 21, a switch is made from the first seal portion 21 to the second seal portion 22, and the second seal portion 22 seals an outer circumference of a second cap member 40, which will be described below.

A heater 16 is arranged in the furnace housing 18 to surround the furnace core tube 15, and an insulating material 17 is received in the furnace housing 18 to coat the outside of the heater 16. The heater 16 heats and fuses the glass preform 11 inserted into the furnace core tube 15, and an optical fiber 12 fused and having a diameter reduced is hung down from the lower chamber 19. The optical fiber drawn in the drawing furnace 10 moves toward a cooling device (not shown). Inert gas, etc. supplied to the drawing furnace is discharged to the outside from a shutter portion and the like of a lower portion of the lower chamber 19 via a gap between the glass preform 11 and the furnace core tube 15.

The glass preform 11 includes a seed rod 11d of a small diameter, a direct body portion 11a of a large diameter of the glass preform 11, and a taper portion 11b having a diameter reduced in a taper shape between the seed rod 11d and the direct body portion 11a. The seed rod 11d is connected to the dummy rod 13 by using an adaptor (not shown), for example.

Figure 2:
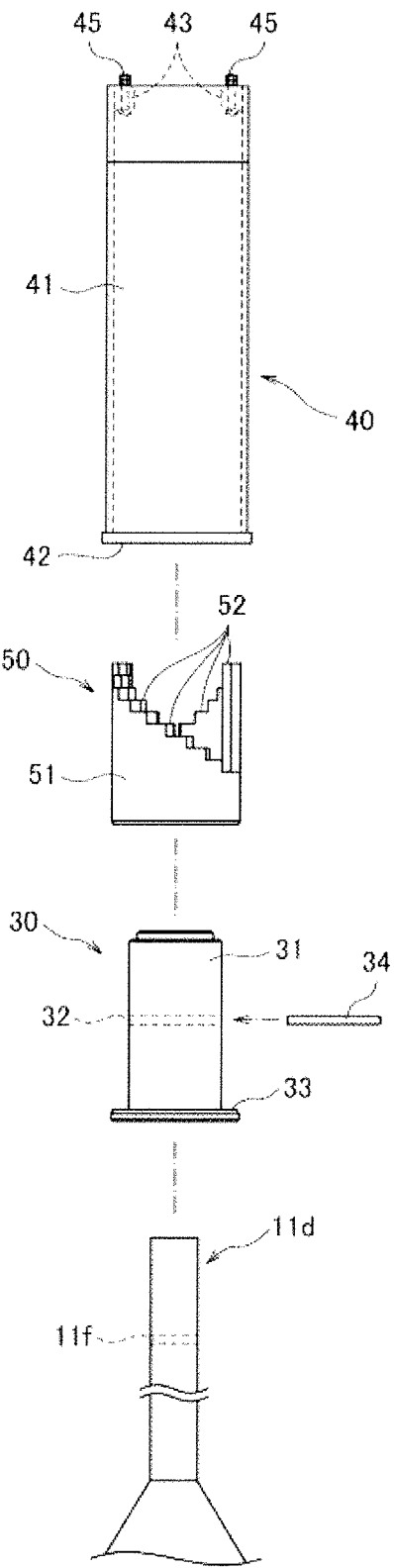
FIG. 2 is a view illustrating an assembly method of a glass preform, first and second cap members, and a spacer member.

FIG. 2 is a view illustrating an assembly method of the glass preform, first and second cap members, and a spacer member. The first cap member 30, the spacer member 50, and the second cap member 40 are assembled with the glass preform 11 shown in FIG. 1 in sequence.

The first cap member 30 includes a tubular main body portion 31 formed with quartz glass, and an inner diameter of the main body portion 31 is larger than an outer diameter of the seed rod 11*d*. In addition, a flange portion 33 is disposed on a lower end of the main body portion 31.

A pin hole 32 having a circular cross section is formed in a predetermined position of the main body portion 31 of the first cap member 30. When the main body portion 31 is inserted from, for example, the upper portion of the seed rod 11*d* and a fixing pin 34 having a circular cross section is inserted in a position where the pin hole 32 corresponds to a pin hole 11*f* of the seed rod 11*d*, the first cap member 30 is engaged with the seed rod 11*d*.

The spacer member 50 is formed with, for example, metal, and has a cylindrical shape to allow the first cap member 30 to be inserted into a center thereof. The spacer member 50 is mounted on the first cap member 30 by inserting the spacer member 50 from the upper portion of the first cap member 30, and placing the spacer member 50 on the flange portion 33. Since an upper surface of the flange portion 33 of the first cap member 30 and a lower end surface of the spacer member 50 are in contact with each other, a gap is not formed therebetween.

Figure 3:
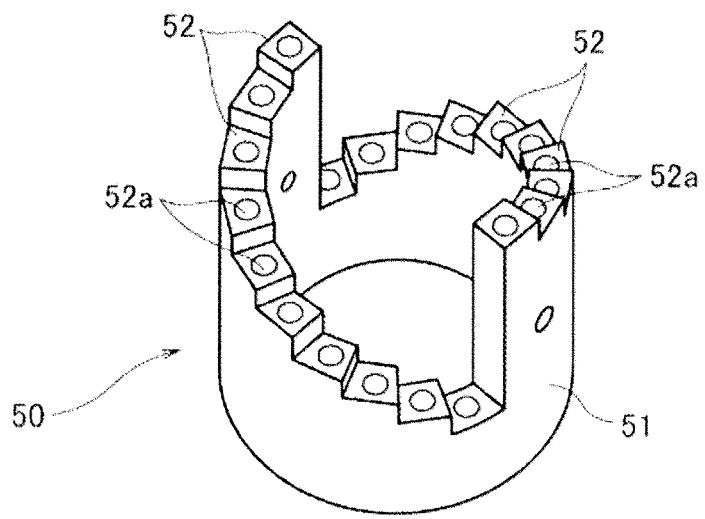
FIG. 3 is a perspective view of the spacer member.

The spacer member 50 is configured to be able to adjust a height position of the second cap member 40. Specifically, as shown in FIG. 3, a main body portion 51 includes pin support portions 52 for supporting the second cap member. The pin support portions 52 are disposed to have the same height on positions facing each other with respect to an axial center of the main body portion 51, and for example, the pin support portions 52 corresponding to a semicircle are formed to have heights gradually reduced in the circumferential direction of the main body portion 51. The pin support portions 52 correspond to a support portion of the present invention.

The pin support portions 52, for example, corresponding to the semicircle, are formed in a step-wise shape of 10 steps, and a circular recess 52*a* is formed on a center of each step. A difference in height between adjacent steps is, for example, about 10 mm. A position of a lower end opening 42 of the second cap member 40 can be changed to an appropriate position of the taper portion 11*b* described in FIG. 1 through one spacer member 50 by changing a support position of the second cap member 40 by rotating the second cap member 40 around an axis.

Figure 4:
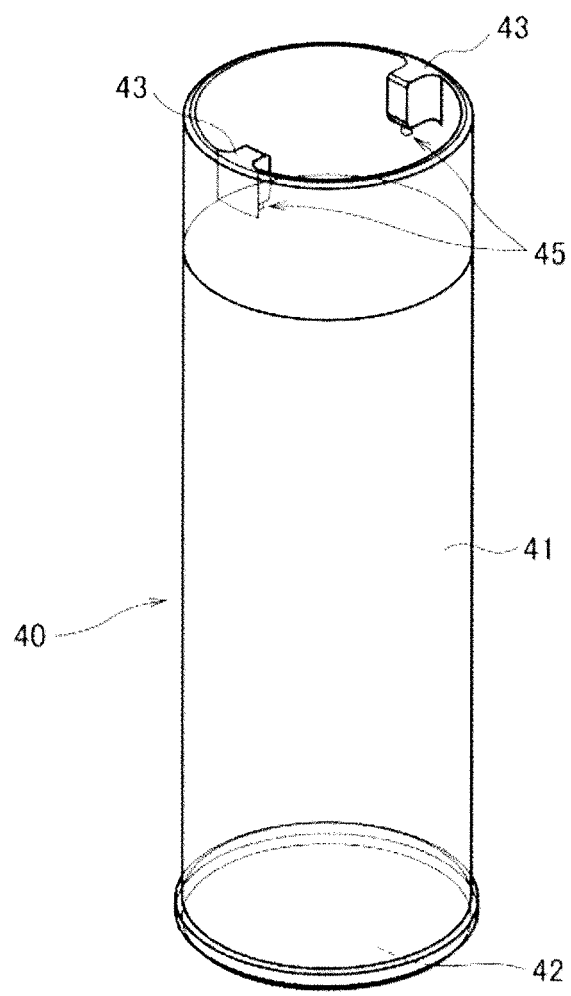
FIG. 4 is a perspective view of the second cap member.

As shown in FIG. 4, the second cap member 40 includes a tubular main body portion 41 formed with, for example, quartz glass, and an inner diameter of the main body portion 41 is larger than an outer diameter of the spacer member 50. In this case, it is desirable to narrow a gap between the main body portion 41 and the spacer member 50 as much as possible to maintain airtightness in the drawing furnace.

When the spacer member 50 is formed with metal, the spacer member 50 may expand and a gap between an inner circumference of the second cap member 40 and an outer circumference of the spacer member 50 becomes narrower or does not exist at the time of drawing since the metal has a great expansion coefficient compared to the quartz glass.

Positioning pins 45 are disposed on, for example, two positions on an upper end of an inner wall of the main body portion 41 of the second cap member 40. In addition, the positioning pins 45 may be formed by forming holes on pin installation portions formed on the inner wall of the main body portion 41 in the vertical direction, and forming the positioning pins 45 in the holes, and heights of the positioning pins 45 may be adjusted by using a bolt or nut. The positioning pins 45 are formed with, for example, metal.

The main body portion 41 of the second cap member 40 may have a periphery portion of the upper end thereof formed to be transparent, such that positioning with respect to the spacer member 50 described in FIG. 2 can be easily performed.

When the glass preform 11 described in FIG. 1 is set in the drawing furnace, the first cap member 30 and the spacer member 50 are assembled with the glass preform 11, and then the second cap member 40 is inserted from the upper portion of the spacer member 50, and, when the positioning pins 45 are supported on the pin support portions 52 of the spacer member 50, the second cap member 40 is mounted on the spacer member 50.

A support position of the second cap member 40 with respect to the pin support portions 52 of the spacer member 50 is adjusted, such that the lower end opening 42 of the second cap member 40 is positioned close to the taper portion 11*b* of the glass preform 11.

Specifically, the second cap member 40 is assembled with the spacer member 50, and positions of the lower end opening 42 of the second cap member 40 and the taper portion 11*b* of the glass preform 11 are identified. When the taper portion 11*b* is exposed further downward than the lower end opening 42, a contact between the positioning pins 45 and the pin support portions 52 is released by lifting up the second cap member 40. Subsequently, the positioning pins 45 are brought into contact with the pin support portions 52 on lower positions by rotating the second cap member 40, for example, and positions of the lower end opening 42 and the taper portion 11*b* are identified. This operation is repeated until the taper portion 11*b* goes to a desirable position.

On the other hand, when the taper portion 11*b* is not exposed from the lower end opening 42, the positioning pins 45 are brought into contact with the pin support portions 52 on higher positions by lifting up the second cap member 40 and by rotating the second cap member 40, for example, and positions of the lower end opening 42 and the taper portion 11*b* are identified.

Figure 5:
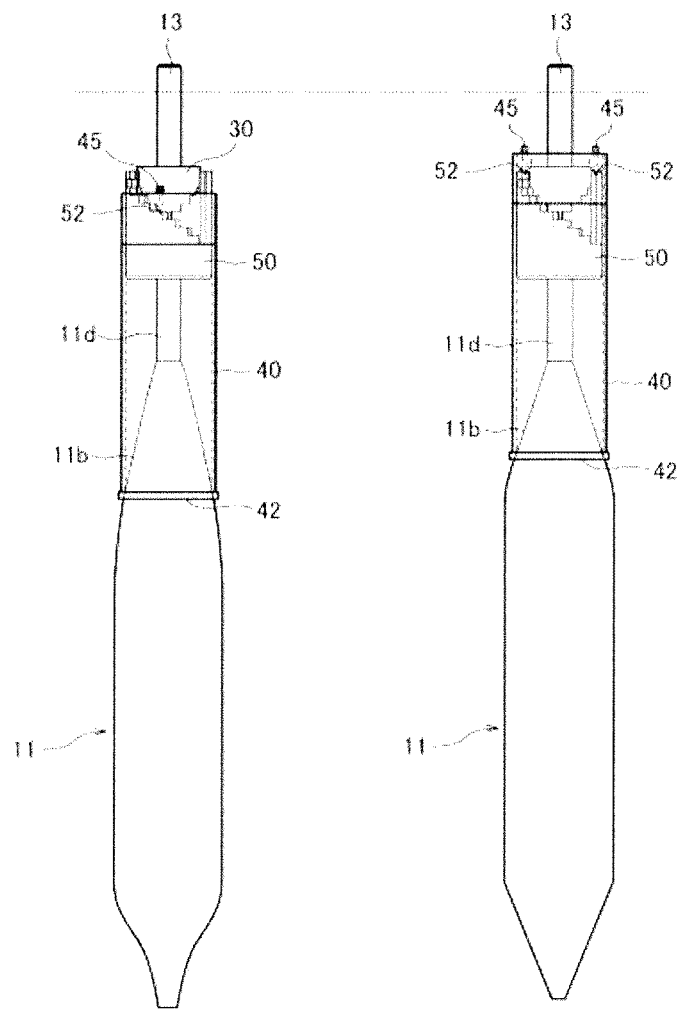
FIG. 5 is a view illustrating the glass preform having the second cap member disposed thereon.

As described above, the spacer member 50 is configured to be able to adjust the height positions of the second cap member 40 in the axial direction. Therefore, even when a position (length) of the taper portion 11*b* of the glass preform 11 is different as shown in FIG. 5, the lower end opening 42 can be always positioned close to the taper portion 11*b*. Accordingly, there is no need to prepare a plurality of spacer members having different heights, and an operation of removing the second cap member from the glass preform and replacing the spacer member is not required. In addition, there is no need to prepare a plurality of second cap members having different heights.

Figure 6:
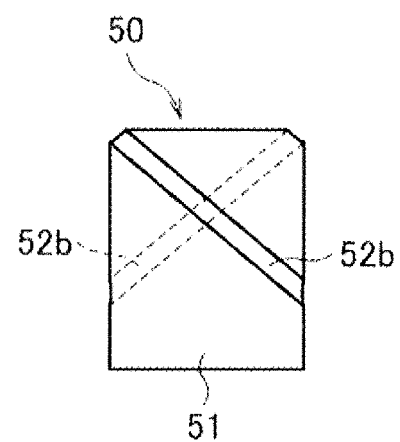
FIG. 6 is a view illustrating a spacer member according to another embodiment.

In the above-described embodiment, an example of the pin support portion formed in a step-wise shape has been described. However, the pin support portions are not limited to the step-wise shape, and may have a structure having a position in the height direction changed, for example, a spiral-shaped groove. Specifically, as shown in FIG. 6, the spacer member 50 may include a spiral-shaped groove 52*b* formed on the outer circumference (side surface) of the main body portion 51 thereof and having a height gradually decreasing in the circumferential direction. In this case, when positioning pins (not shown) protruding from the inner circumference of the second cap member are disposed, the second cap member can be supported on the spacer member 50.

Figure 7:
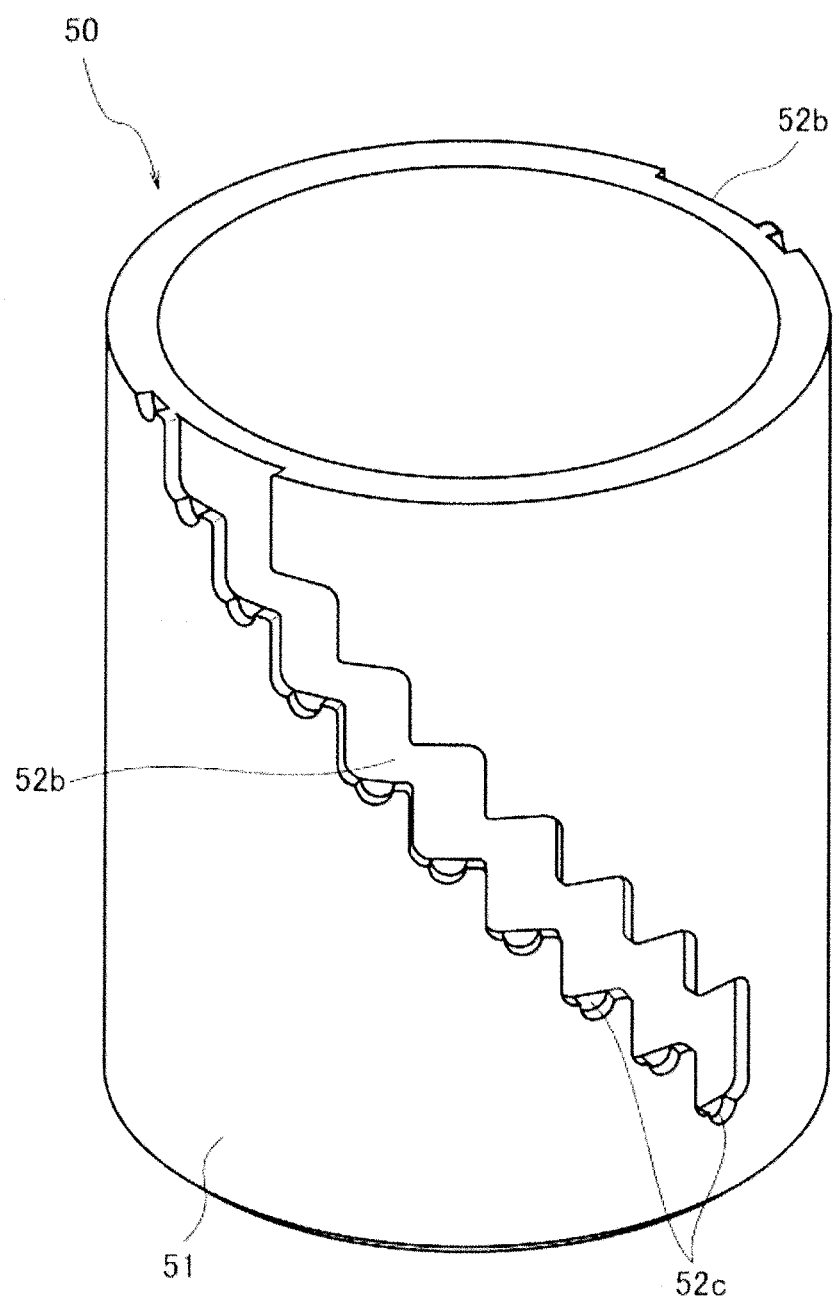
FIG. 7 is a view illustrating a spacer member according to still another embodiment.

In addition, as shown in FIG. 7, the spiral-shaped groove 52b may be formed in a step-wise shape, and a recess 52c may be formed on a center of each step portion, and the positioning pins may be fixed to the recess 52c.

It should be understood that the embodiments disclosed herein are exemplary in view of all aspects and are not limited. The scope of the present invention is defined not by the meaning described above but by the accompanying claims, and is intended to include equivalents to the claims and all changes within the claims.

The invention claimed is:

1. A seal structure for an optical fiber drawing furnace for plugging a gap between an upper end opening of the optical fiber drawing furnace and an optical fiber glass preform which has a seed rod and a taper portion present in an upper portion thereof, the seal structure comprising:
    a first cap member which engages with the seed rod of the optical fiber glass preform;
    a second cap member which covers the taper portion of the optical fiber glass preform and the first cap member;
    a spacer member which is disposed between the first cap member and the second cap member, and supports the second cap member, adjusts a height position of the second cap member in an axial direction by a position adjustment structure, and causes a lower end of the second cap member to be positioned close to the taper portion; and
    a seal member which establishes a seal between the optical fiber glass preform and/or the second cap member, and the upper end opening,
    wherein the position adjustment structure comprises support portions formed on an upper surface of the spacer member in a circumferential direction and having different height positions in the axial direction.

2. The seal structure according to claim 1, wherein the support portions are formed in a step-wise shape.

3. An optical fiber production method comprising:
    plugging a gap between an upper end opening of an optical fiber drawing furnace and an optical fiber glass preform which has a seed rod and a taper portion present in an upper portion thereof using the seal structure according to claim 1; and
    drawing out an optical fiber by heating and fusing the optical fiber glass preform in the drawing furnace.

4. A seal structure for an optical fiber drawing furnace for plugging a gap between an upper end opening of the optical fiber drawing furnace and an optical fiber glass preform which has a seed rod and a taper portion present in an upper portion thereof, the seal structure comprising:
    a first cap member which engages with the seed rod of the optical fiber glass preform;
    a second cap member which covers the taper portion of the optical fiber glass preform and the first cap member;
    a spacer member which is disposed between the first cap member and the second cap member, and supports the second cap member, adjusts a height position of the second cap member in an axial direction by a position adjustment structure, and causes a lower end of the second cap member to be positioned close to the taper portion; and
    a seal member which establishes a seal between the optical fiber glass preform and/or the second cap member, and the upper end opening,
    wherein the position adjustment structure comprises support portions formed on a side surface of the spacer member in a circumferential direction and having different height positions in the axial direction.

* * * * *